United States Patent Office 3,486,662
Patented Dec. 30, 1969

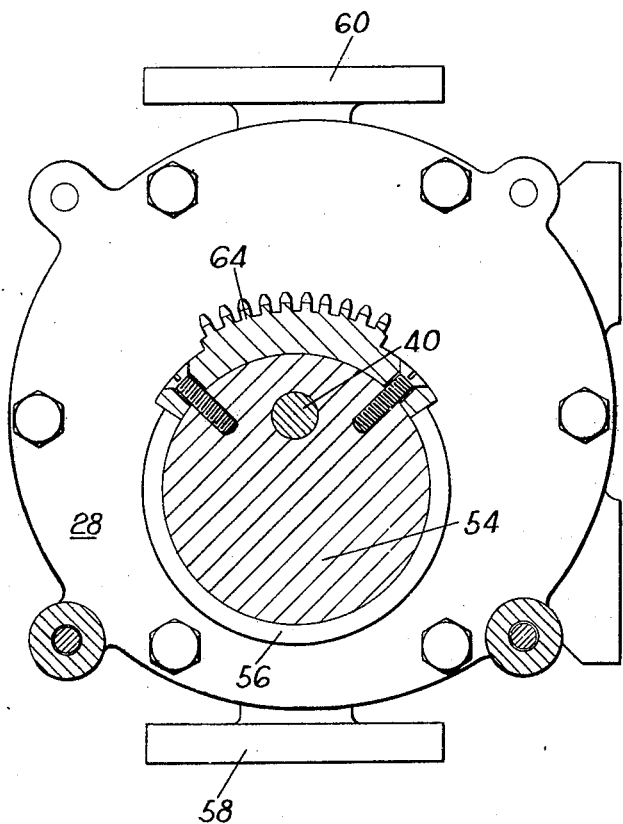

1

3,486,662
LIQUID DISPENSING APPARATUS
Colin Roderick Petyt, Middlesex, and Hugh Edmund Phillips, London, England, assignors to Avery-Hardoll Limited, Chessington, Surrey, England, and Beck & Co. (Meters) Limited, London, England, both British companies
Filed Oct. 24, 1967, Ser. No. 677,567
Claims priority, application Great Britain, Nov. 1, 1966, 49,003/66
Int. Cl. B67d 5/52, 5/60
U.S. Cl. 222—134      4 Claims

ABSTRACT OF THE DISCLOSURE

A fluid flow proportioner wherein two variable positive displacement meters are interconnected so that a separate fluid passes through each, the proportion being determined by the adjustment of the meters. Each meter is a radial vane rotor in an adjustable eccentric casing, the arrangement being that a single control increases the eccentricity of one while decreasing the other.

---

This invention relates to liquid fuel dispensing apparatus. It is especially concerned with apparatus for dispensing blends of two different liquids, e.g., two petrols of different octane rating or petrol and oil.

Such apparatus normally incorporates, for each of the liquids, a pump which forces liquid from a tank or the like through a meter to a common output or dispensing point, e.g., a nozzle. The relative proportions of each of the liquids flowing through the two flow lines has to be controlled in accordance with the blend which is to be dispensed. The control of the flow of the individual liquids has to be accurate and is preferably arranged so that as the proportion of one liquid increases the proportion of the other decreases, in other words as the volume flowing per unit time of one liquid is increased the volume flowing per unit time of the other liquid is diminished. Further it is desired for the arrangement to be such that either of the two liquids alone, can be dispensed if desired.

A liquid flow controller for this purpose in accordance with the invention comprises two variable capacity liquid "meters" (preferably positive displacement meters) having their shafts connected and each being designed to act as a pump/motor when inserted respectively into the flow lines of the two liquids to be blended. Thus liquid can only flow through the controller in accordance with the setting of the capacity of the two "meters." For example if the capacity of one "meter" is set to be twice that of the other, then a blend of two parts of the liquid passing through the said one "meter" and one part of the liquid passing through the other "meter," will be dispensed.

The invention also extends to liquid fuel dispensing apparatus incorporating such a flow controller, the two "meters" being located in the flow lines of the two liquids respectively at a point after the liquids have passed through the normal volume indicating meters and prior to the dispensing point.

Preferably the means for changing the capacity of the two "meters" is connected to both "meters" and is arranged to diminish the capacity of one "meter" as the capacity of the other "meter" is increased. Consequently, when one "meter" is set to its maximum capacity of the other "meter" will be zero so that only one of the two liquids can be dispensed, if desired.

As the capacities of the two "meters" are adjusted in unison only a single control needs to be used to select the blend.

2

Such a "meter" preferably comprises vanes, extending radially from the shaft and working in a chamber formed between the casing of the meter and the periphery of a movable rotor, the inlet and outlet being opposite to each other and the position of the rotor relative to the casing being adjustable radially to alter the capacity of the meter, i.e., to alter the capacity of the chambers between the vanes, the rotor periphery and the casing and hence to alter the volume of liquid which can pass through the meter from the inlet to the outlet for each rotation of the shaft.

When the capacity of a "meter" is to be set to zero this is done by locating the rotor centrally so that the volume of the chambers on the inlet side of the meter are equivalent to those on the outlet side with the result that the vanes, on rotation, merely paddle round without passing liquid through the meter. When the "meter" is set to a maximum capacity the chambers on one side of the diameter are at a maximum whilst those on the other side are at a minimum.

In order to diminish the pressures exerted across the two "meters" it is preferred to use a pressure regulating device comprising two valve elements connected together through a diaphragm or piston located in a chamber. One of the valve elements is located in the flow lines of each of the liquids respectively between the flow controller and the nozzle and the piston or diaphragm chamber is open on each side of the piston or diaphragm to the pressure in each of the flow lines at a point between the normal meters and the flow controller, the arrangement being such that pressure in the flow line of one liquid before the flow controller tends to move the diaphragm in the direction to close the valve located in the flow line of that liquid against the pressure exerted directly on that valve element by the liquid after passing through the controller.

The invention will now be further described by way of example with reference to the accompanying drawings, in which:

FIGURE 5 is a section on the line V—V of FIGURE 3;

Figure 1:
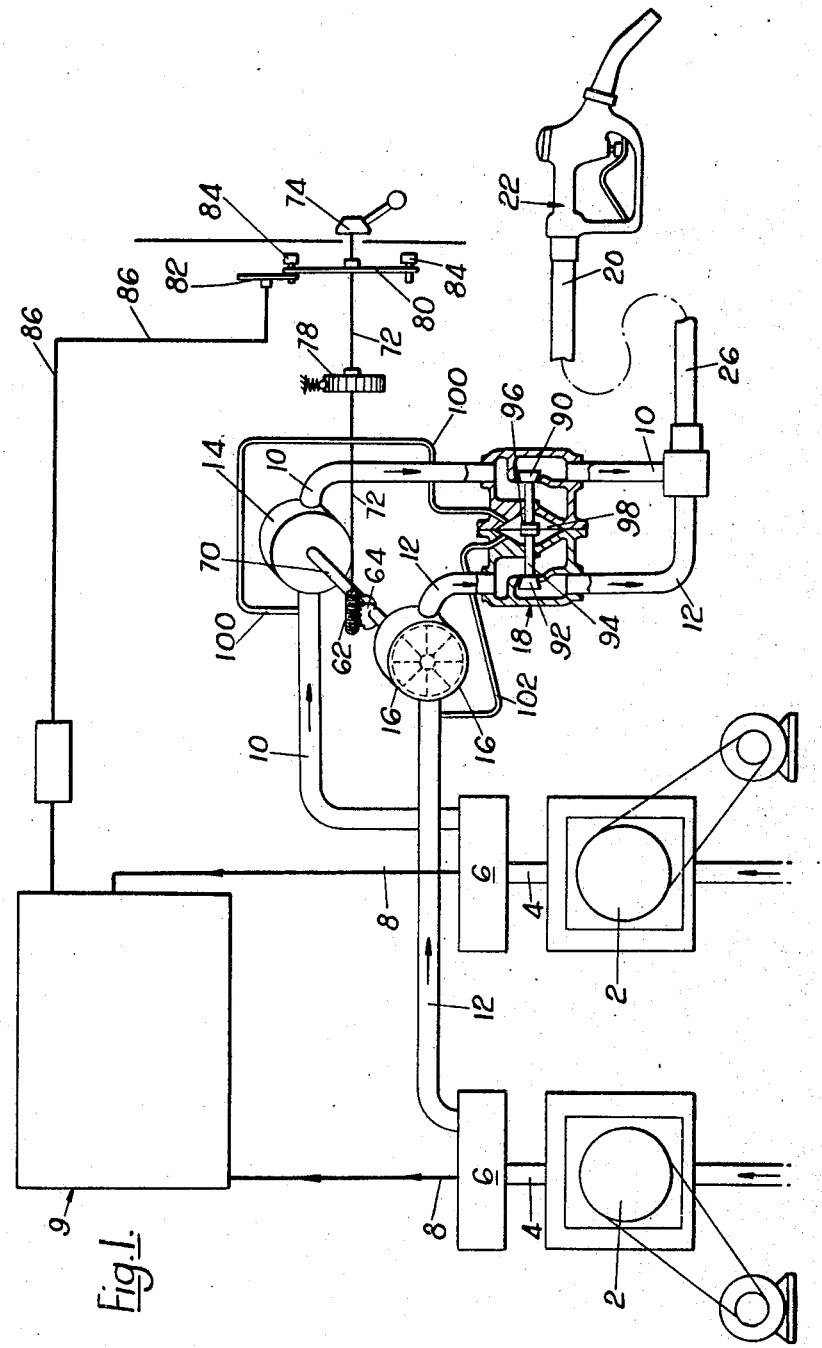
FIGURE 1 is a rough diagram showing some of the components of liquid dispensing apparatus in accordance with the invention.

Referring to FIGURE 1 petrol of relatively high and relatively low octane rating is pumped by pumping units 2, from tanks (not shown), along flow lines 4 to conventional meters 6 the output shafts of the meters, which are driven as liquid is pumped through, being connected through mechanical linkage, generally indicated at 8, to a standard price computing and quantity indicating device diagrammatically indicated at 9 such as that described in the specification of our Patent No. 3,420,409 of Jan. 7, 1969.

The petrols from the the two meters 6 flow through pipes 10, 12 respectively to "meters" diagrammatically indicated in FIGURE 1 at 14, 16 and forming part of a liquid flow controller described in detail hereafter. The capacity of each of these two meters controls the rate of flow of liquid passing through it and hence the relative proportions of the two liquids which are to be dispensed. The two liquid flow pipes 10, 12 then pass through a pressure regulating device generally indicated at 18 to a concentric hose 20 which discharges a blend of the two liquids through a single nozzle part of which is shown at 22 in FIGURE 1.

The liquid flow controller an example of which is shown in more detail in FIGURES 2–5 comprise two "meters" each having a number of outwardly extending radial vanes 24 which have their outer ends arranged to provide a sliding seal with the inner wall 26 of the casing 28 of the meter. The inner end of the vanes abut the peripheral surface of rings 30 through roller bearings 32.

Each vane passes through a slot in a rotor 34 which is pinned at 36 to a boss 38 of a shaft 40 which is common to both meters. The rotors can thus rock slightly around the boss to align themselves. The blades 24 are free to move in the slots of the rotor but are biased outwardly by means of springs 42 (see FIGURE 3). The outer periphery of the rotor 34 and the inner surface 26 of the casing together with the vanes 24 define chambers 44 the relative volume of which determines the capacity of the meter. The chambers are closed by front and rear covers 46, 48 bolted to the casing. The rotor of each meter is formed on each side face with two protruding sealing grooves 50.

The shaft 40 is mounted in bearings 52 in a rotary bush 54 which is mounted for rotation in a housing 56 located between the two meters. The centre line of the shaft 40 is set off centre from the centre line of the bush 54 so that on rotation of the bush 54 in the housing 56 the shaft 40 is moved relatively to the housing 56 with the consequence that the two rotors 34 are moved relatively to their casings 28 to alter the capacity of the chambers 24 between the inlet 58 and the outlet 60 of each meter.

The bush 54 is moved relatively to the housing 56 on turning of a worm gear 62 (see FIGURE 1) which engages a rack 64 secured to the periphery of the bush 54 and projecting through a slot in the housing 56.

As the two "meters" are conected by the shaft 40, the rotors of each will rotate together. Consequently, liquid passing through the two "meters" will be strictly proportioned to the relative capacities of the two meters.

Figure 2:
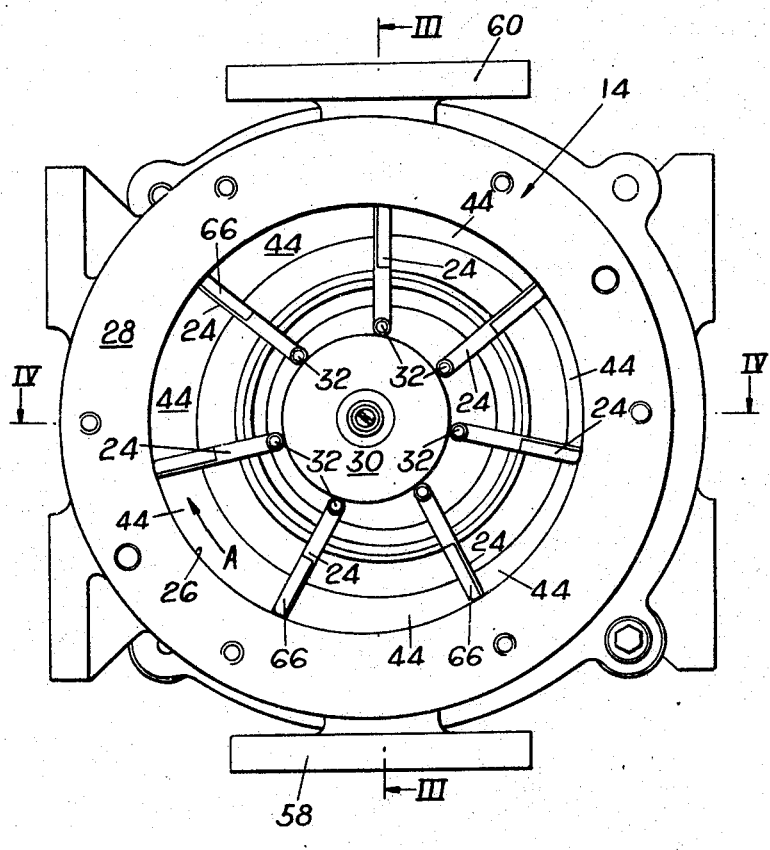
FIGURE 2 is a front elevation of one embodiment of flow controller in accordance with the invention with the cover removed.
Figure 3:
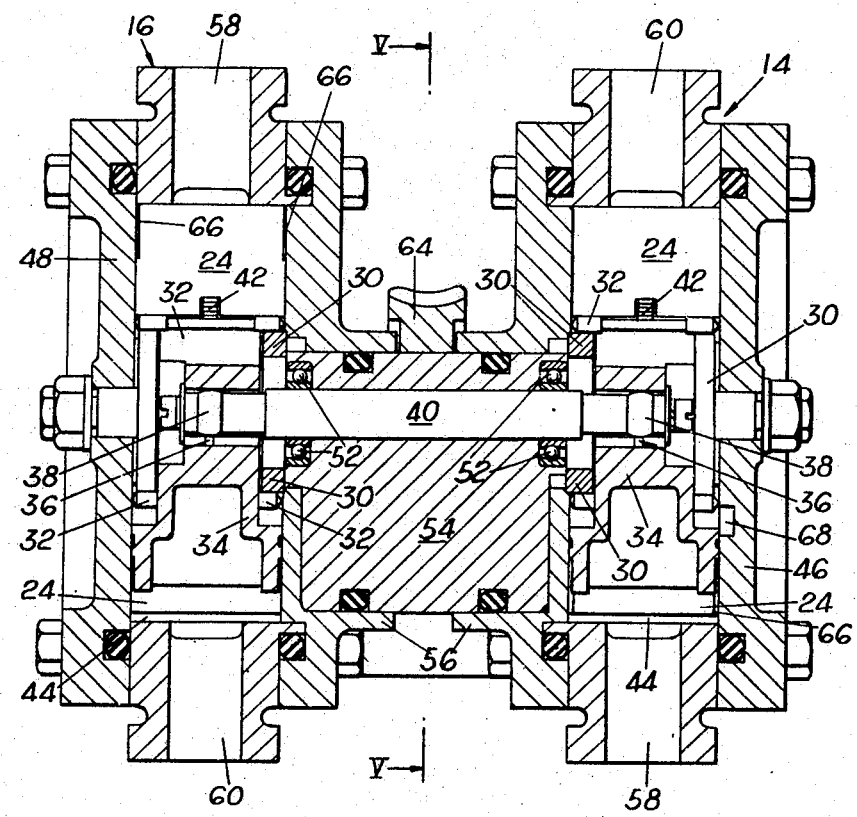
FIGURE 3 is a section on the line III—III of FIGURE 2.
Figure 4:
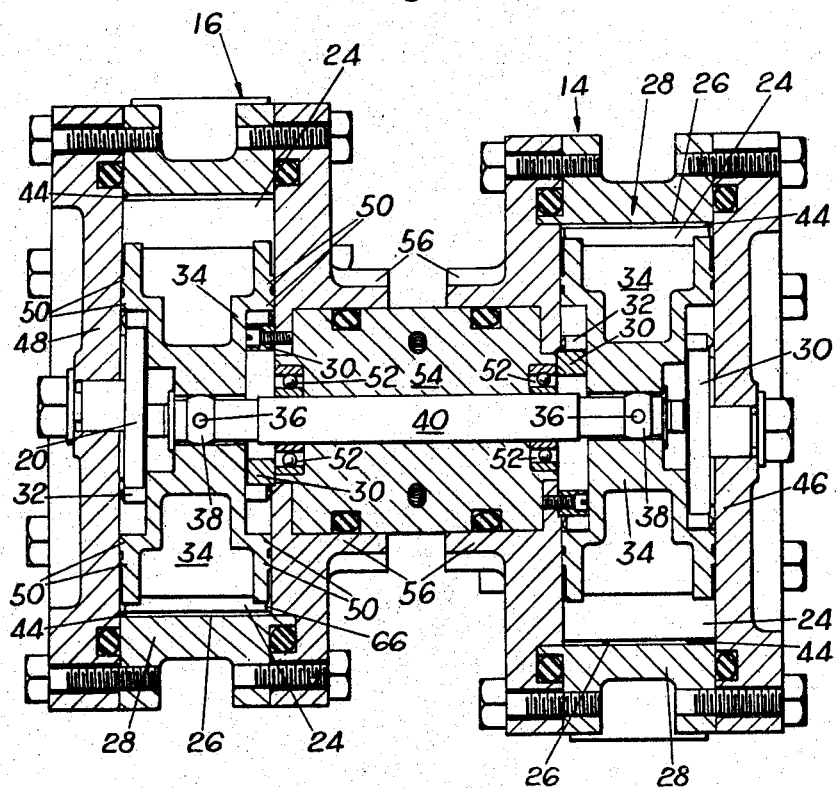
FIGURE 4 is a section on the line IV—IV of FIGURE 2.

As can be seen from FIGURES 3 and 4 the capacity of both of the meters are shown in the drawings as being equal so that equal volumes of the two liquids will be passed for each rotation. However the relative arrangement of the casing for the rotors of the two "meters" is eccentric (see FIGURE 4)—(the eccentricity of the bush 54 relative to the shaft 40 being shown in FIGURE 3)—and is made such that if the shaft 40 is moved to the right as seen in FIGURES 2 and 5 (upwards in FIGURE 4) then the rotors will be moved in their casing in such a way that the capacity of the right hand meter 14 (see FIGURES 3 and 4) will be increased to a maximum, i.e., the chambers 44 between the inlet 58 and the outlet 60 in the direction of flow indicated by the arrow A will be at a maximum, the rotor of the left-hand meter 16 will then be centralised within the casing 28 so that the chambers 44 are of equal volume around the periphery of the rotor.

In this condition no liquid will be dispensed through the left-hand meter 16 but the vanes and rotor will merely be rotated by the pressure of the liquid rotating the rotor in the right-hand meter 14 liquid will be churned around the meter without being dispensed.

As the rack 64 is moved to diminish the capacity of the meter 14 the rotor 34 of that meter is moved relatively downwardly as shown in FIGURES 3 and 4 of the drawings, and relatively to the right as seen in FIGURE 2. The corresponding movement of the rotor of the meter 16 causes an increase in volume of the chambers between the inlet and outlet of that meter. An increasing volume of liquid will then be passed by the meter 16 to correspond with the decreasing amount of liquid passed by the meter 14 until the "meter" 16 has a maximum capacity and the relevant chambers of the meter 14 will then be of equal size around the periphery of the rotor so as to pass no liquid.

It will thus be realised that any desired proportion of the two liquids passed by the controller can be achieved merely by turning the rotary bush 54 to alter the relative positions of the two rotors in the casings of the two meters respectively.

In order to obtain a good seal between the blades and the casing the edges of the blades are chamfered as is indicated at 66 in FIGURE 2 on the side of the blades facing away from the inlet during passage around the casing between the inlet and outlet. This chamfer causes an oil film to exert an inward force tending to centralise the blades against the side faces of the chambers. As a further aid to maintaining a good seal, a port 68 (see FIGURE 3) is provided in the front and rear covers leading from the centre to the outside of the rotor so as to equalise the inlet pressure across the vanes.

The bush 54 is shown in FIGURE 1 for diagrammatic purposes as a shaft 70 which is identical in function to the bush. The shaft 70 is moved angularly by the rack 64 through the worm 62 on turning a shaft 72 by a blend selector handle 74. The degree of movement to produce any desired blend is shown on a dial and the precise movement for the blend is assisted by a detent device illustrated at 78 or by any other convenient device. A drive is transmitted from the shaft 72 through discs 80, 82 and pegs 84 to a mechanical drive illustrated at 88 to adjust the setting of a price computing apparatus as is described in detail in the specification of our U.S. Patent No. 3,420,409 of Jan. 7, 1969.

In order to reduce the possibilities of leakage of liquid through the meters 14, 16 past the vane tips it is desired to reduce the pressure differential across the meters. It will be appreciated that the meter which is holding back liquid relatively to the comparatively greater flow of liquid through the other meter, is subjected to an increased pressure differential and this is reduced by use of the pressure regulator diagrammatically indicated at 18 in FIGURE 1.

The regulator includes valve clements 90, 92 located in the flow lines 10, 12 of the two liquids respectively and connected by a shaft 94. As can be seen the pressure of the liquid in say the pipe 10 tends to move the element 90 to a more open position and to move the valve 92 into a position closing the flow through the pipe 12. The pressure in the pipe 12 tends to move the valves in the opposite direction. A diaphragm 96 is secured to the shaft 94 and extends across a chamber 98 which is connected on each side of the diaphragm 96 to one of the pipes 10, 12, respectively, at the other side of the "meters" 14, 16, through pipes 100, 102.

Assuming that the "meter" 16 is relatively holding back liquid as compared with the meter 14, the pressure difference across the meter 16 will be higher than that across the meter 14 and in order to reduce this pressure difference it is desirable to restrict the flow through the valve element 92 so as to tend to increase the pressure at the outlet side of the meter 16. As the pressure in the pipe 10 after the "meter" 14 is higher than that in the pipe 12 after "meter" 16, the pressure in pipe 10 acting on element 90 will tend to move the coupled valves to the right as shown in the drawing tending to open the valve 90 and close the valve 92. This movement is helped by the upstream pressure transmitted through the pipes or conduits 100, 102, the conduit 100 transmitting a lower pressure to the right-hand side of diaphragm 96 then the pressure transmitted to the left-hand side of the diaphragm through the conduit 102. The pressure difference moves the diaphragm to the right tending to open the valve element 90 and close the element 92. Thus the valve elements will automatically adopt a position minimising the pressure differences across both "meters."

If the tanks containing one of the petrols was to run dry the pressure in the flow line from that tank would drop drastically. It is then essential to prevent petrol being pumped from the other tank. This is achieved by movement of the diaphragm 96. For example if the petrol being transmitted through the flow line 10 was to stop, no pressure would be transmitted by the upstream conduit 100 whereas pressure would still be transmitted through the upstream conduit 102. This pressure through the pipe 102 would move the diaphragm 96 to the right as shown in the drawings to close the valve 92 entirely on to its seat to stop flow of petrol through the flow line 12. This is achieved quickly due to the greater area of the diaphragm 96 as compared with the area of that side of the valve element 92 on which petrol flowing through pipe 12 impinges. When it is desired to dispense only one petrol, a mechanical interlock (not shown) comes into effect to maintain the valve element in the flow line of the petrol to be dispensed, open, despite the fact that no petrol is flowing through the other flow line.

Due to the coupling of the meters it has been found that the proportions of the two liquids flowing past the "meters" can be maintained to the desired figures very accurately.

We claim:

1. A liquid flow controller for use with apparatus for dispensing blends of two different liquids comprising two variable capacity positive displacement liquid meters having their shafts connected and means for changing the capacity of the meters, said means for changing the capacity of the two meters being connected to each meter and arranged to diminish the capacity of one as the capacity of the other is increased, each of said meters further comprising a plurality of vanes extending radially from the shaft thereof and arranged in an annular chamber formed between the casing of the meter and the periphery of a movable slotted rotor, the position of each rotor relative to each casing being adjustable radially to alter the capacity of the meter.

2. A liquid flow controller as claimed in claim 1 in which the connected shafts of the two meters is moved by an eccentric means relatively to the casing thereof to alter the capacity of each of the meters.

3. A liquid flow controller as claimed in claim 1 in which the edge of each blade of each meter is chamfered along the face of the blades facing away from the inlet in the direction of flow between the inlet and the outlet of the meter.

4. A liquid flow controller as claimed in claim 1 in which the vanes are arranged to extend through the slotted rotor, said vanes being arranged for rotation by said shaft means and ring means associated therewith.

References Cited

UNITED STATES PATENTS

| 1,964,028 | 6/1934 | Boynton et al. | 222—134 X |
| 2,898,002 | 8/1959 | Blanchet et al. | 222—26 |
| 3,092,129 | 6/1963 | Steen | 222—26 X |

ROBERT B. REEVES, Primary Examiner

H. S. LANE, Assistant Examiner

U.S. Cl. X.R.

103—11, 120; 222—139